US007650001B2

(12) United States Patent
Yasushi et al.

(10) Patent No.: US 7,650,001 B2
(45) Date of Patent: Jan. 19, 2010

(54) DUMMY SOUND GENERATING APPARATUS AND DUMMY SOUND GENERATING METHOD AND COMPUTER PRODUCT

(75) Inventors: Mitsuo Yasushi, Saitama (JP); Masatoshi Yanagidaira, Saitama (JP); Motoji Hashimoto, Tokyo (JP)

(73) Assignee: Pioneer Corporation, Tokyo (JP)

( * ) Notice: Subject to any disclaimer, the term of this patent is extended or adjusted under 35 U.S.C. 154(b) by 1075 days.

(21) Appl. No.: 11/050,777

(22) Filed: Feb. 7, 2005

(65) Prior Publication Data

US 2005/0232432 A1    Oct. 20, 2005

(30) Foreign Application Priority Data

Feb. 9, 2004    (JP) .............................. 2004-032377

(51) Int. Cl.
*H03G 3/00*    (2006.01)
*H04B 1/00*    (2006.01)

(52) U.S. Cl. .......................................... 381/61; 381/86

(58) Field of Classification Search ................... 381/86, 381/61, 124; 700/94
See application file for complete search history.

(56) References Cited

U.S. PATENT DOCUMENTS

| | | | | |
|---|---|---|---|---|
| 5,237,617 A | * | 8/1993 | Miller | 381/61 |
| 5,586,187 A | * | 12/1996 | Webb | 381/61 |
| 5,635,903 A | | 6/1997 | Koike et al. | |
| 6,275,590 B1 | * | 8/2001 | Prus | 381/61 |
| 7,203,321 B1 | * | 4/2007 | Freymann et al. | 381/61 |
| 2005/0175186 A1 | | 8/2005 | Yasushi et al. | |

FOREIGN PATENT DOCUMENTS

| | | |
|---|---|---|
| JP | 6-70098 U | 9/1994 |
| JP | 7-142946 A | 6/1995 |
| JP | 7-182587 A | 7/1995 |
| JP | 7-232571 A | 9/1995 |
| JP | 7-322403 A | 12/1995 |
| JP | 10-201001 A | 7/1998 |
| JP | 11-288291 A | 10/1999 |
| JP | 2002-233001 A | 8/2002 |
| JP | 2002-238101 A | 8/2002 |
| JP | 2004-153929 A | 5/2004 |

\* cited by examiner

*Primary Examiner*—Xu Mei
(74) *Attorney, Agent, or Firm*—Foley & Lardner LLP

(57) ABSTRACT

A dummy sound generating apparatus includes a dummy sound information storage unit that stores one or more dummy sounds, and an outer generating unit that generates one of the one or more dummy sounds outside of the vehicle upon reception of a dummy sound generation instruction signal. The dummy sound generating apparatus also includes a generation place information storage unit that stores information on a place where a dummy sound is to be generated a current position information acquiring unit that acquires information on a current position of the vehicle, and a control unit that outputs a dummy sound generation instruction signal to the outer generating unit when the current position acquired by the current position information acquiring unit matches with information on a place stored in the generation place information storage unit.

18 Claims, 15 Drawing Sheets

FIG.6

| | 601 | 602 | 603 | 604 | 605 | 606 | |
|---|---|---|---|---|---|---|---|
| | DAY AND TIME | POSITION | DIREC-TION | OBJECT | SPEED | TEMPERA-TURE/ HUMIDITY | ... |
| | 2004/01/16 12:13:00 | n= 35.4237··· e=139.3625··· | SOUTH-EAST | SAME DIRECTION:0 OPPOSITE DIRECTION: 3 | 32.5Km | 18.4°C 25% | ... |
| | 2004/01/16 12:13:10 | n= 35.4237··· e=139.3625··· | SOUTH-EAST SOUTH | SAME DIRECTION: 2 OPPOSITE DIRECTION 3 | 30.0Km | 18.4°C 25% | ... |
| | ⋮ | ⋮ | ⋮ | ⋮ | ⋮ | ⋮ | ⋮ |

FIG.7

| CONDITIONS | BEHAVIOR |
|---|---|
| WHEN VEHICLE ENTERS IN CROSSING FOOTPATH FROM PRINCIPAL ROAD FOR ENTERING IN GAS STAND, CONVENIENCE STORE OR THE LIKE | SWITCH ON |
| WHEN VEHICLE DEVIATES FROM PRINCIPAL ROAD, SUCH AS PARKING FOR SHOP | SWITCH ON |
| NEAR SERVICE AREA ON EXPRESS HIGHWAY | SWITCH ON |
| WHEN VEHICLE ENTERS IN EXPRESS HIGHWAY | SWITCH OFF |
| ⋮ | ⋮ |

FIG.8

| CONDITIONS | BEHAVIOR |
|---|---|
| WHEN SPEED BECOMES SLOW AND DRIVER FREQUENTLY STEERS STEERING WHEEL | SWITCH ON |
| WHEN DRIVER STEERS BACK STEERING WHEEL AND VEHICLE DEVIATES FROM STRAIGHT LINE | SWITCH ON |
| WHEN DRIVER FREQUENTLY OPERATES BRAKE | SWITCH ON |
| WHEN DRIVER PUTS HIS/HER HAND ON HORN | SWITCH ON |
| | ⋮ |

FIG.9

| CONDITIONS | BEHAVIOR |
|---|---|
| WHEN DRIVER'S HEART RATE IS HIGH | SWITCH ON |
| WHEN EYEBALL MOTION FREQUENTLY OCCURS AND DRIVER IS CAUTIOUS | SWITCH ON |
| WHEN DRIVER'S MOVES FREQUENTLY AND HE/SHE IS RESTLESS | SWITCH ON |
| ⋮ | ⋮ |

FIG.10

| CONDITIONS | BEHAVIOR |
|---|---|
| WHEN PERSON IS PRESENT IN RUNNING DIRECTION OF VEHICLE | SWITCH ON |
| WHEN IT IS RAINING | SWITCH ON |
| WHEN DRIVER CAN NOT RECOGNIZE FOOTPATH SINCE THERE IS NO ROAD SHOULDER | SWITCH ON |
| ⋮ | ⋮ |

FIG.11

| CONDITIONS | BEHAVIOR |
|---|---|
| WHEN VEHICLE IS NEAR DESTINATION | SWITCH ON |
| WHEN VEHICLE ENTERS IN SHOPPING STREET | SWITCH ON |
| WHEN VEHICLE IS PRESENT ON NARROW ROAD OR LIFE ROAD BUT NOT ON PRINCIPAL ROAD | SWITCH ON |
| WHEN VEHICLE IS AT INTERSECTION CONSIDERING SET ROUTE | SWITCH ON |
| WHEN VEHICLE ENTERS WIDE ROAD FROM NARROW ROAD | SWITCH ON |
| WHEN VEHICLE ENTERS NARROW ROAD FROM PRINCIPAL ROAD | SWITCH ON |
| WHEN VEHICLE RUNS ON ROAD THAT DOES NOT HAVE FOOTPATH | SWITCH ON |
| ⋮ | ⋮ |

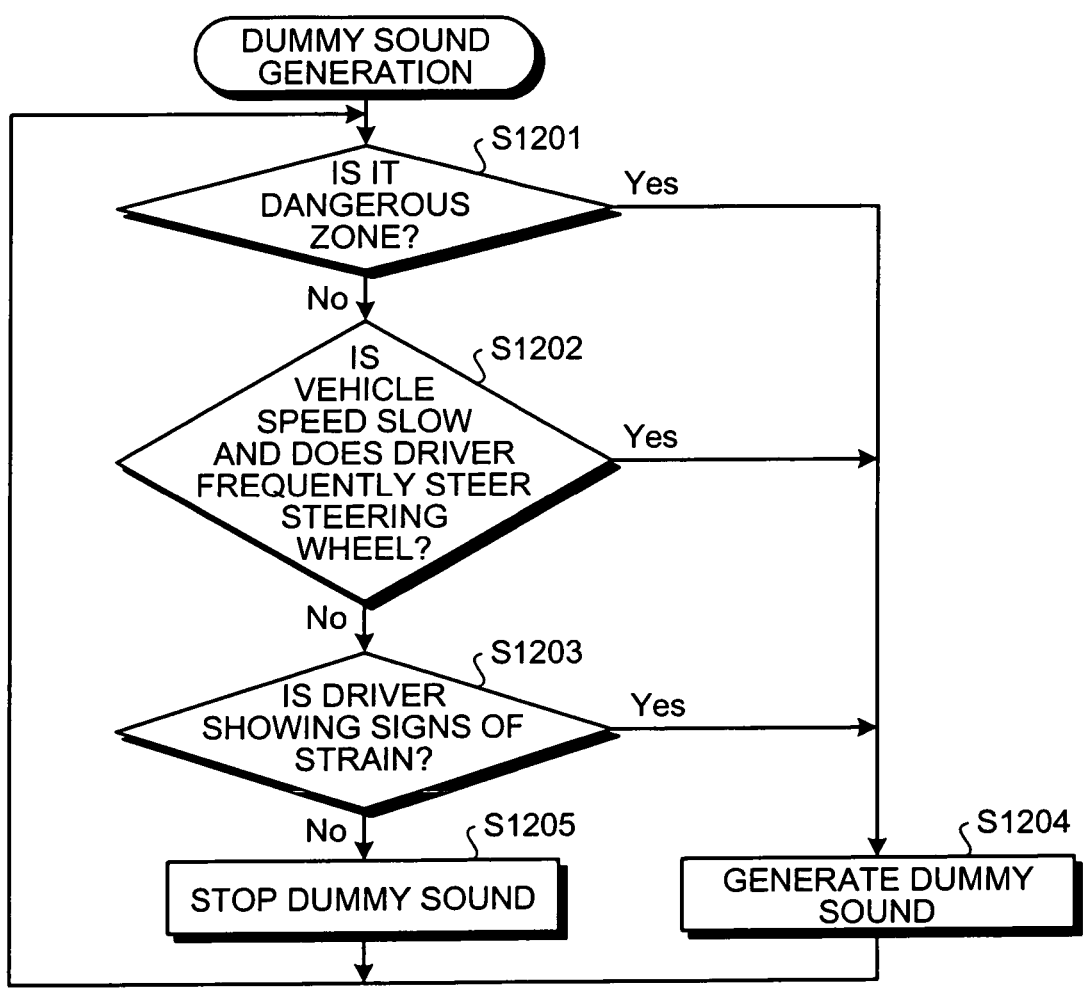

DUMMY SOUND GENERATING APPARATUS AND DUMMY SOUND GENERATING METHOD AND COMPUTER PRODUCT

BACKGROUND OF THE INVENTION

1) Field of the Invention

The present invention relates to technology for generating a dummy sound of an engine of a vehicle.

2) Description of the Related Art

In recent years, in addition to vehicles using an internal combustion engine, vehicles using a motor have been developed and sold commercially. Further, noises due to an engine sound from a conventional internal combustion engine have been largely reduced.

A dummy sound generating apparatus for an electric vehicle has been disclosed in JP-A-07-182587. This apparatus generates a dummy sound suitable for an electric vehicle, such as a starting sound, a running sound and an acceleration/deceleration sound during running. The apparatus also allows adjustment of a dummy sound volume in response to surrounding noises.

However, in the conventional arts, since a dummy sound can be adjusted automatically in response to surrounding noises, noise reduction can be realized during night or in a calm place. However, if a pedestrian or bicyclist does not notice the approaching of a vehicle because of the absorbed engine sound, there is a possibility that an unintended accident happens. Since a pedestrian or bicyclist generally notices that a vehicle is approaching from an engine sound unintentionally, the approach of a vehicle by sound or light except for the dummy sound may create unexpected anxiety.

SUMMARY OF THE INVENTION

It is an object of the present invention to solve at least the problems in the conventional technology.

A dummy sound generating apparatus according to an aspect of the present invention generates a dummy sound of a vehicle. The dummy sound generating apparatus includes a dummy sound information storage unit that stores one or more dummy sounds; an outer generating unit that generates one of one or more dummy sounds outside of the vehicle upon reception of a dummy sound generation instruction signal; a generation place information storage unit that stores information on a place where a dummy sound is to be generated; a current position information acquiring unit that acquires information on a current position of the vehicle; and a control unit that outputs the dummy sound generation instruction signal to the outer generating unit based on information on the place stored in the generation place information storage unit and information on the current position acquired by the current position information acquiring unit.

A vehicle according to another aspect of the present invention includes the above dummy sound generating apparatus according to the present invention.

A dummy sound generating method according to still another aspect of the present invention is a method for generating dummy sound of a vehicle. The dummy sound generating method includes acquiring information on a current position of the vehicle; and generating a dummy sound outside the vehicle based on information, stored in advance, on a place where a dummy sound is to be generated and the information acquired on the current position.

The computer-readable recording medium according to still another aspect of the present invention stores therein a computer program which causes a computer to execute the above method for generating dummy sound of a vehicle.

The other objects, features, and advantages of the present invention are specifically set forth in or will become apparent from the following detailed description of the invention when read in conjunction with the accompanying drawings.

BRIEF DESCRIPTION OF THE DRAWINGS

FIG. 6 is an explanatory diagram of one example of information stored in a hard disk (HD);

FIG. 7 is an explanatory diagram of one example of a determination table stored in the HD;

FIG. 8 is an explanatory diagram of another example of a determination table stored in the HD;

FIG. 9 is an explanatory diagram of another example of a determination table stored in the HD;

FIG. 10 is an explanatory diagram of another example of a determination table stored in the HD;

FIG. 11 is an explanatory diagram of another example of a determination table stored in the HD;

FIG. 12 is a flowchart of one example of a determining process for a control unit;

DETAILED DESCRIPTION

Exemplary embodiments of the present invention will be explained below in detail with reference to the accompanying drawings.

Figure 1:
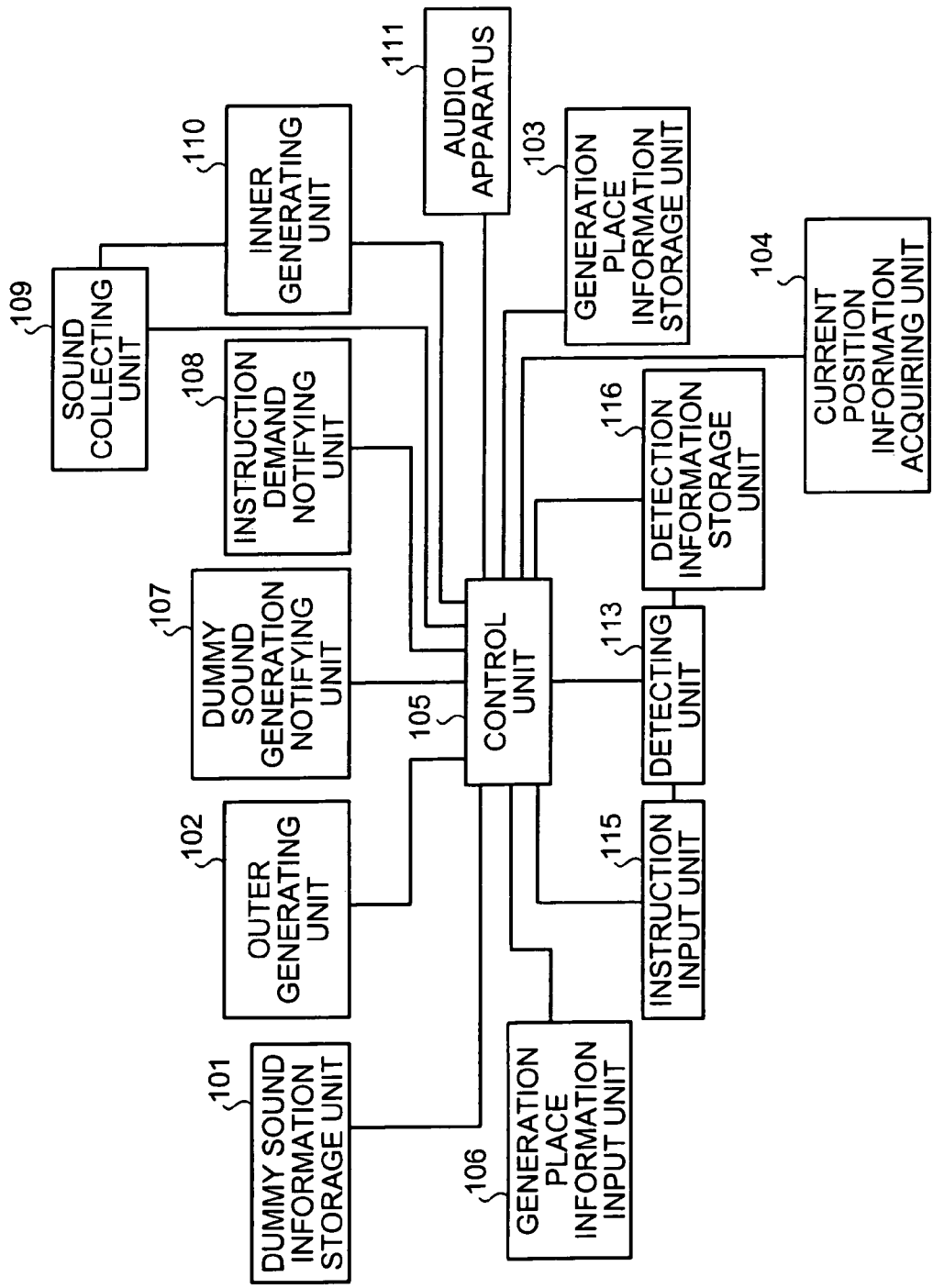
FIG. 1 is a block diagram of one example of a dummy sound generating apparatus according to an embodiment of the present invention.

First, the content of a dummy sound generating apparatus according to an embodiment of the invention will be explained. FIG. 1 is a block diagram of one example of a dummy sound generating apparatus according to an embodiment of the invention. In FIG. 1, a dummy sound generating apparatus equipped with a vehicle, such as a four-wheel vehicle or a two-wheel vehicle, includes a dummy sound information storage unit 101, an outer generating unit 102, a generation place information storage unit 103, a current position information acquiring unit 104, a control unit 105, a generation place information input unit 106, a dummy sound generation notifying unit 107, an instruction demand notifying unit 108, a sound collecting unit 109, an inner generating unit 110, a detecting unit 113, an instruction input unit 115 and a detection information storage unit 116.

The dummy sound information storage unit 101 stores information of a dummy sound generated by the vehicle. Specifically, the dummy sound is a sound obtained by synthesizing, for example, reproductions of engine sounds or braking sounds of a vehicle. Further, the dummy sound information storage unit 101 may store information on a plurality of kinds of dummy sounds. Specifically, the kinds of dummy sounds may be sounds falling in a plurality of bands, for example.

The outer generating unit 102 generates a dummy sound outside of the vehicle based on dummy sound information stored in the dummy sound information storage unit 101. Specifically, for example, reproductions of engine sounds or braking sounds of a vehicle are synthesized, and the dummy sound thus synthesized is outputted, for example, by a speaker provided outside the vehicle.

The generation place information storage unit 103 stores information identifying a place where a dummy sound is generated. The place where a dummy sound is generated may be a place specified by, for example, the latitude and the longitude (for example, it may be "a XX-chome intersecting point" or "at a back gate of XX Elementary School"), and it may be an ordinary public place (for example, "a school zone" or "an intersecting point").

The current position information acquiring unit 104 acquires information on a current position of the vehicle. For example, the current position information acquiring unit 104 can be configured to acquire information on the latitude and the longitude by a GPS 410 described later.

The control unit 105 controls an output of a dummy sound generation instruction signal to the outer generating unit 102 based on information stored in the generation place information storage unit 103 and information acquired by the current position information acquiring unit 104.

The control unit 105 may be configured to control an output of a dummy sound generation instruction signal to the outer generating unit 102 based on at least one of calendar information and time information. The dummy sound generation instruction signal can be, for example, a signal that instructs ON/OFF (start/termination) of a dummy sound generation.

The control unit 105 may be configured to change a direction in which a dummy sound is generated by the outer generating unit 102 based on information stored in the generation place information storage unit 103 and information acquired by the current position information acquiring unit 104. Specifically, such a configuration may be employed that, for example, when a vehicle moves straight, a dummy sound is generated in a forward direction, and when the steering wheel is steered left or light and the vehicle turns left or right, a dummy sound is generated in the direction that the vehicle turns.

The control unit 105 is configured to output a dummy sound selecting signal that selects at least one dummy sound from the information on a plurality of kinds of dummy sounds stored in the dummy sound information storage unit 101 based on information stored in the generation place information storage unit 103 and information acquired by the current position information acquiring unit 104.

The control unit 105 may be configured to control an output of a dummy sound generation instruction signal to the outer generating unit 102 based on information stored in the generation place information storage unit 103 and information acquired by the current position information acquiring unit 104 and to control an output of a sound volume control instruction signal to an audio apparatus 111, such as a CD player, an MD player, a cassette tape player, a DVD player, or a car navigation device, provided inside the vehicle. The sound volume control instruction signal may be, for example, an instruction signal that mutes the sound volume of the audio apparatus 111 or reduces the sound volume to a predetermined volume. As a result, it can be made clear to a driver or vehicle passenger that a dummy sound is being generated.

The generation place information input unit 106 receives an input corresponding to information of a place where a dummy sound is generated. The generation place information storage unit 103 stores information corresponding to the input received by the generation place information input unit 106.

The dummy sound generation notifying unit 107 notifies that a dummy sound is being generated. The control unit 105 performs output control of a generation notifying instruction signal to the dummy sound generation notifying unit 107 when a dummy sound generation instruction signal is provided to the outside-vehicle generation unit 102.

The instruction demand notifying unit 108 issues a notification that a demand for an instruction for a dummy sound has been generated. The control unit 105 performs output control of an instruction demand notifying instruction signal to the instruction demand notifying unit 108 based on information stored in the generation place information storage unit 103 and information acquired by the current position information acquiring unit 104 or based on information stored in the detection information storage unit 116 instead of performing output control of a dummy sound generation instruction signal to the outer generating unit 102.

The sound collecting unit 109 collects outside-vehicle surrounding sounds including a dummy sound generated outside the vehicle by the outer generating unit 102. Specifically, a function of the unit 109 can be implemented by, for example, a microphone provided outside the vehicle. The inner generating unit 110 generates dummy sounds collected by the sound collecting unit 109 inside the vehicle. The inner generating unit 110 can output, for example, vehicle-outside surrounding sounds collected by a speaker provided outside the vehicle.

The detecting unit 113 detects various predetermined situations when the vehicle is running. The detecting unit 113 can detect a situation outside the vehicle in addition to, for example, a vehicle speed, the rpm of the engine, and a state of the transmission (or gear). The situation outside the vehicle includes at least one of a weather condition, a road situation, a situation of a pedestrian and a situation of other vehicles such as a bicycle. The detecting unit 113 may be configured to detect a position where the vehicle is running.

The detecting unit 113 may be configured to detect a state of operation of the vehicle instead of detecting the various predetermined situations while the vehicle is running or in addition to detecting the various predetermined situations while the vehicle is running. The state of operation of the vehicle can be, for example, a state of the steering wheel, the acceleration pedal, the braking pedal, the transmission, the lighting switches for the lights, or a wiper. The detecting unit 113 is configured to detect a state of a driver of the vehicle. The state of a driver of the vehicle can be, for example, a fatigue degree or a continuous driving time of the driver.

The control unit 105 controls an output of a dummy sound generation instruction signal to the outer generating unit 102 based on information stored in the generation place information storage unit 103 and information acquired by the current position information acquiring unit 104 or based on the result detected by the detecting unit 113.

The control unit 105 may be configured to change a direction in which a dummy sound is generated by the outer generating unit 102 based on information stored in the generation place information storage unit 103 and information acquired by the current position information acquiring unit 104 or based on the result detected by the detecting unit 113.

The control unit 105 may be configured to output a dummy sound selecting signal that selects at least one dummy sound from information on a plurality of kinds of dummy sounds stored in the dummy sound information storage unit 101 based on information stored in the generation place information storage unit 103 and information acquired by the current position information acquiring unit 104 or based on the result detected by the detecting unit 113.

The control unit 105 may be configured to control an output of a sound volume control instruction signal to the audio apparatus 111 provided inside the vehicle and to control an output of a dummy sound generation instruction signal to the outer generating unit 102 based on information stored in the generation place information storage unit 103 and information acquired by the current position information acquiring unit 104 or based on the result detected by the detecting unit 113.

The instruction input unit 115 receives an instruction to start/terminate a dummy sound generation provided inside the vehicle. Specifically, the instruction input unit 115 receives an instruction to start/terminate a dummy sound generation by turning ON/OFF a dummy sound generating switch provided, for example, inside the vehicle.

The detection information storage unit 116 stores information on the result detected by the detecting unit 113 when a start/terminate instruction of a dummy sound generation is issued by the instruction input unit 115. The control unit 105 controls an output of the dummy sound generation instruction signal to the outer generating unit 102 based on the start/terminate instruction of a dummy sound generation issued by the instruction input unit 115 and controls an output of the dummy sound generation instruction signal to the outer generating unit 102 on the basis of information stored in the detection information storage unit 116 and the result detected by the detecting unit 113.

The control unit 105 can compare, for example, one or a combination of two or more of a weather situation, a road situation, a situation of walkers and a situation of other vehicles (e.g., a bicycle), a state of operation of a vehicle, and a state of a drive of the vehicle, which are stored in the detection information storage unit 116. This information can be obtained by the control unit 105 when a start instruction for a dummy sound generation has been issued, with one or a combination of a weather situation, a road situation, a situation of walkers and a situation of other vehicles including a bicycle, a state of operation of a vehicle, a state of the driver of the vehicle, which are detected by the detecting unit 113. The control unit 105 also outputs a dummy sound instruction signal when the former information and the latter information are coincident with each other. A termination instruction to a dummy sound generation is made similarly.

The control unit 105 performs various controls in this manner, but such a configuration may be implemented so that these controls are respectively performed alone or performed with any combination thereof.

Figure 2:
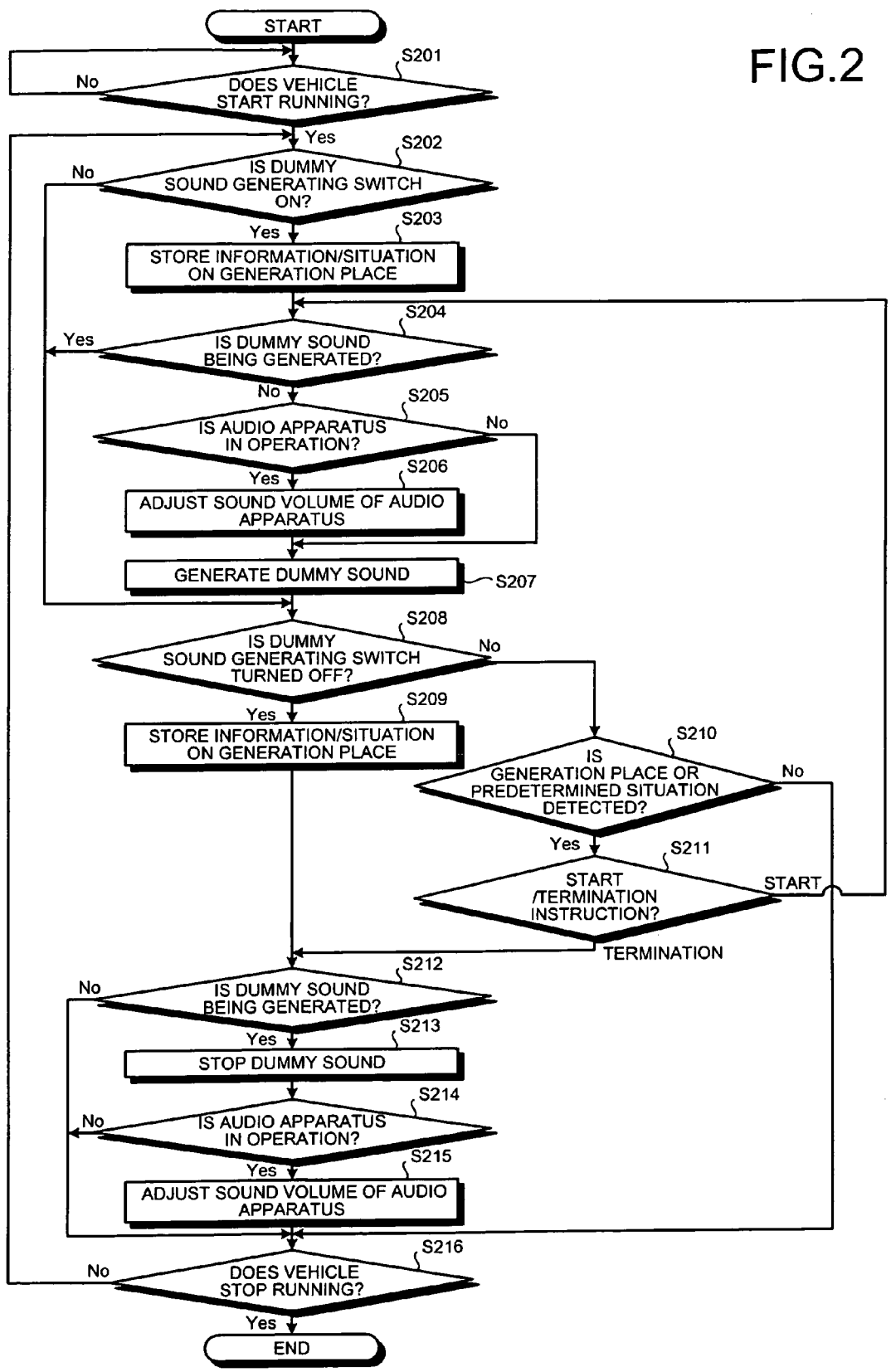
FIG. 2 is a flowchart of one example of a dummy sound generating method according to an embodiment of the present invention.

A procedure performed by a dummy sound generating method according to the embodiment of the present invention will be explained. FIG. 2 is a flowchart of one example of a process performed by a dummy sound generating method according to the embodiment of the invention. First, a determination is made about whether the vehicle starts to run (step S201).

At step S201, if standby is maintained until the vehicle starts to run and the processing starts after the vehicle starts to run (step S201: yes), then a determination is made about whether an instruction to start a dummy sound generation has been issued by turning ON a dummy sound generation switch provided inside the vehicle (step S202). If the dummy sound generating switch is not turned ON (step S202: No), then the control moves to step S208 without performing any processing.

Meanwhile, at step S202, when the dummy sound generating switch is turned ON (step S202: Yes), information relating to a place (position) at that moment (generation place information), a situation or status obtained at this time is stored (step S203). It is determined whether a dummy sound is already being generated (step S204). If the dummy sound is already being generated (step S204: Yes), then the control moves to step S208 without performing any processing.

Meanwhile, if the dummy sound is not being generated (step S204: No), then it is determined whether the audio apparatus is in operation (step S205). When the audio apparatus is not in operation (step S205: No), the control moves to step S207 without performing any processing. Meanwhile, if the audio apparatus is in operation (step S205: Yes), then the volume of the audio apparatus is adjusted (step S206), and a dummy sound is generated (step S207). When the dummy sound is generated, the driver or vehicle passenger may be notified that the dummy sound is being generated.

Thereafter, at step S208, it is determined whether an instruction for termination of the dummy sound generation has been issued by turning OFF the dummy sound generating switch provided inside the vehicle. If the dummy sound generating switch is turned OFF (step S208: Yes), information relating to a place (position) at that moment (generation place information), a situation or status obtained at this time is detected, information on the detection situation is stored (step S209), and the control moves to step S212.

Meanwhile, at step S208, if the dummy sound generating switch is not turned OFF (step S208: No), it is determined whether a present position is a place where a dummy sound is generated or whether a predetermined situation is detected (step S210). If the present position is not the place where the dummy sound is generated or if the predetermined situation is not detected (step S210: No.), the control moves to step S216. On the contrary, if the present position is the place where the dummy sound is generated or if the predetermined situation is detected (step S210: Yes), then it is determined whether the detected situation is related to a start instruction or whether it is related to a termination instruction (step S211).

At step S211, if the situation is the start instruction (step S211: start), then the control returns back to step S204, but the control moves to step S212 if the situation is the termination instruction (step S211: termination).

At step S212, it is determined whether the dummy sound is being generated. When the dummy sound is not being generated (step S212: No), the control moves to step S216 without performing any processing. Meanwhile, if the dummy sound is being generated (step S212: Yes), then the dummy sound is stopped (step S213). If notification is being made when the dummy sound is being generated, the notification is stopped.

It is determined whether the audio apparatus is operating (step S214). Here, if the audio apparatus is not operating (step S214: No), then the control moves to step S216 without performing any processing. Meanwhile, if the audio apparatus is operating (step S214: Yes), then the sound volume of the audio apparatus is adjusted (step S215). For example, the sound volume can be returned back to a sound volume before the dummy sound is generated, and the control moves to step S216.

At step S216, it is determined if the vehicle has stopped running (step S216). If the vehicle running has not yet stopped running (step S216: No), then the control returns back to step S202, and steps S202 to S216 are performed repeatedly. If the vehicle stops running (step S216: Yes), a series of processings is terminated.

Figure 3:
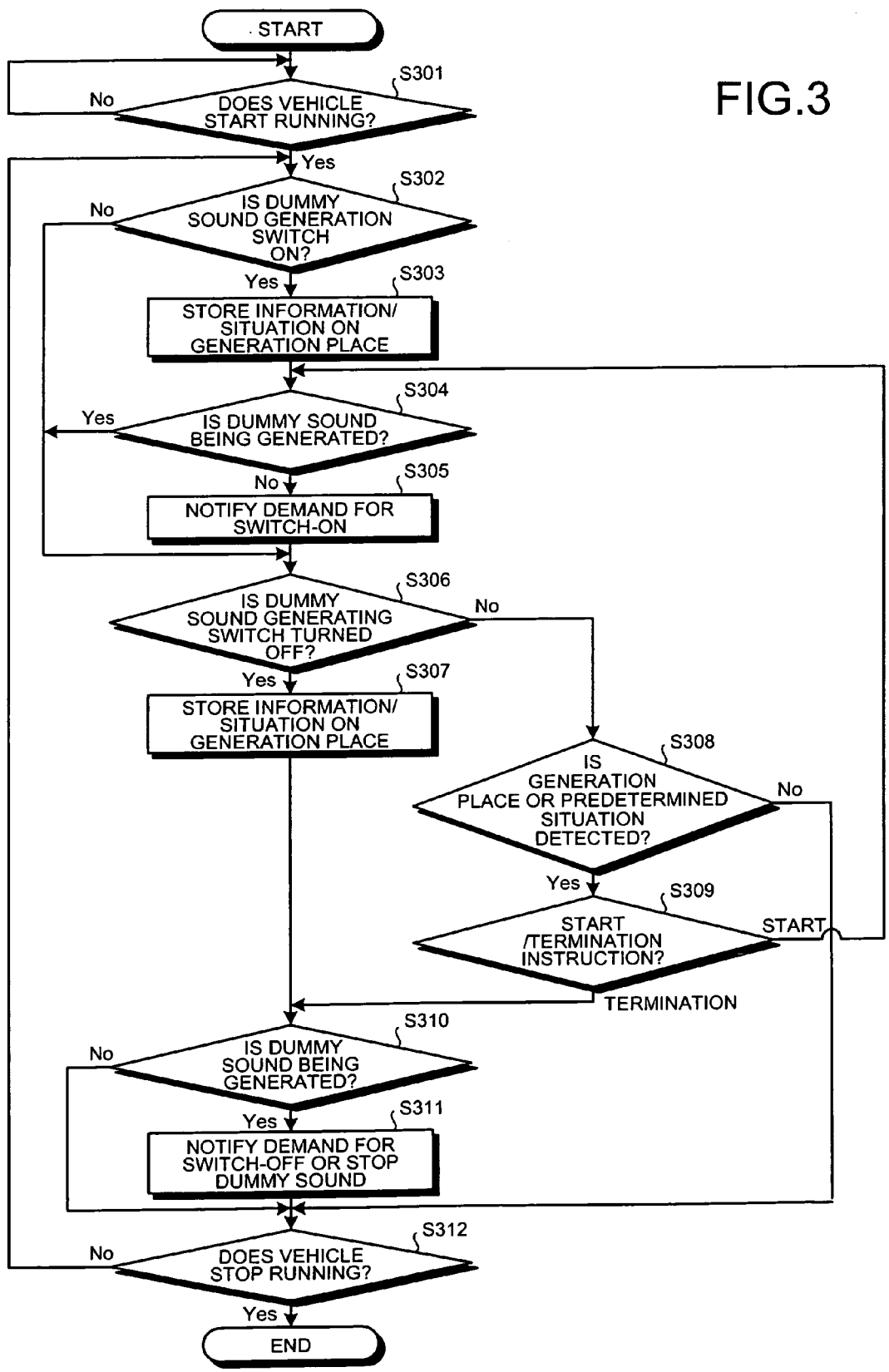
FIG. 3 is a flowchart of another example of a dummy sound generating method according to an embodiment of the present invention.

FIG. 3 is a flowchart of another example of a process for a dummy sound generating method according to the embodiment of the present invention. The flowchart shown in FIG. 3 is for notifying a dummy sound instruction demand to an operator or a vehicle passenger instead of actual generation of a dummy sound. As shown in the flowchart shown in FIG. 3, it is determined whether a vehicle has started to run (step S301).

At step S301, if standby is maintained until the vehicle starts to run and processing starts after the vehicle starts to run (step S301: Yes), then a determination is made about whether an instruction for starting dummy sound generation has been issued by turning ON the dummy sound generating switch provided inside the vehicle (step S302). If the dummy sound generating switch is not turned ON (step S302: No), then the control moves to step S306 without performing any processing.

At step S302, if the dummy sound generating switch is turned ON (step S302: Yes), then information relating to a place (position) at that moment (generation place information), a situation or status detected at that time is stored (step S303). It is determined whether a dummy sound is already being generated (step S304). If the dummy sound is already being generated (step S304: Yes), then the control moves to step S306 without performing any processing. If a dummy sound is not being generated, however (step S304: No), then a generation instruction for a dummy sound is demanded by notifying a driver or vehicle passenger to turn ON a dummy sound generation switch (step S305).

At step S306, it is determined whether an instruction for termination of the dummy sound generation has been issued by turning OFF the dummy sound generating switch provided inside the vehicle. If the dummy sound generating switch is turned OFF (step S306: Yes), then information relating to a place (position) at that moment (generation place information), the situation or status at that time is detected, information on the detected situation is stored (S307), and the control moves to step S310.

At step S310, it is determined whether the dummy sound is being generated. If the dummy sound is not being generated (step S310: No), then the control moves to step S312 without performing any processing. Meanwhile, if the dummy sound is being generated (step S310: Yes), then the dummy sound is stopped (step S311), and the control moves to step S312.

At step S306, if the dummy sound generating switch is not turned OFF (step S306: No), then it is determined whether a present position is a place where a dummy sound is generated or whether a predetermined situation has been detected (step S308). If the present position is not the place where the dummy sound is generated or if the predetermined situation has not been detected (step S308: No), the control moves to step S312. On the contrary, if the present position is the place where the dummy sound is generated or if the predetermined situation has been detected (step S308: Yes), then it is determined whether the detected situation is related to a start instruction or to a termination instruction (step S309).

At step S309, if the situation is the start instruction (step S309: start), then the control returns back to step S304. The control moves to step S310 if the situation is the termination instruction (step S309: termination).

At step S310, it is determined whether the dummy sound is being generated. If the dummy sound is not being generated (step S310: No), then the control moves to step S312 without performing any processing. If the dummy sound is being generated (step S310: Yes), then a stop instruction of the dummy sound is demanded by notifying the driver or vehicle passenger to turn OFF the dummy sound generating switch (step S311). The dummy sound may be stopped without demanding the stop instruction. Thereafter, the control moves to step S312.

At step S312, it is determined whether the vehicle has stopped running. When the vehicle has not yet stopped running (step S312: No), the control returns back to step S302, and steps S302 to S312 are performed repeatedly. If the vehicle has stopped running (step S312: Yes), a series of processings is terminated.

Next will be explained when to use a dummy sound (such as a dummy running sound, i.e., an engine sound). In general, a pedestrian recognizes that a vehicle is approaching from behind by hearing but not seeing the approaching vehicle. If the pedestrian feels danger, the pedestrian may turn to see the approaching vehicle in some cases. Accordingly, when a vehicle approaches without being heard by the pedestrian, the pedestrian may not recognize that the vehicle is approaching, which may be problematic to the pedestrian.

However, when an alarm sound is generated by a horn or by an artificial alarm sound when a vehicle moves back, a pedestrian may be surprised by the sound and feel uncomfortable or stressed in many cases. Accordingly, it is useful for a pedestrian to recognize the approach or passing-through of a vehicle. That is, since there is a problem if the pedestrian does not notice or recognize the approach of a vehicle, it is useful to notify the pedestrian of the approach of a vehicle. Accordingly, a sound to be generated is preferably a normally generated dummy sound, and by generating a dummy sound at an applicable time, the safety of a pedestrian can be achieved while limiting noise generation.

Figure 4:
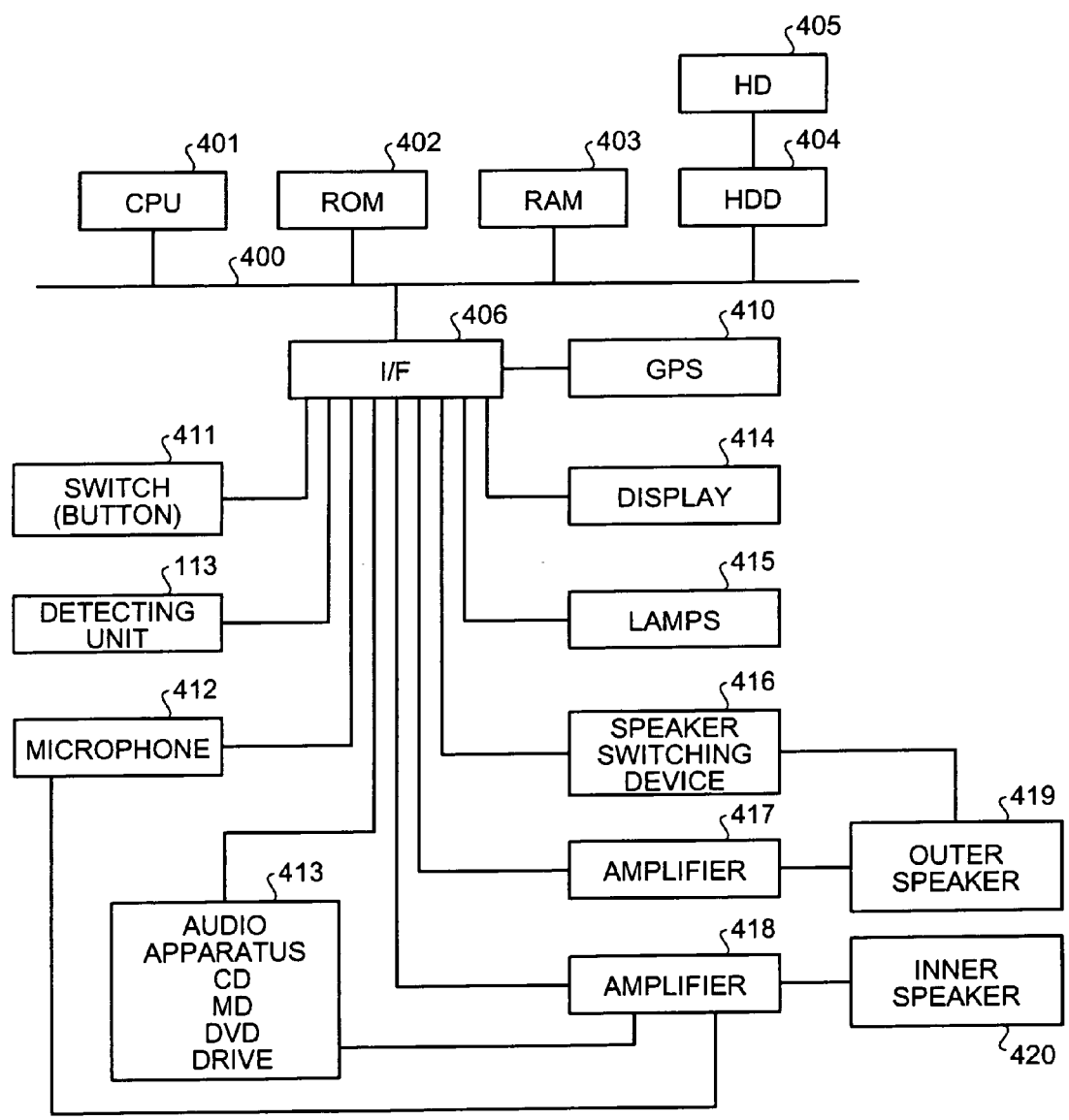
FIG. 4 is a block diagram showing a dummy sound generating apparatus according to an example of the present invention.

Next, a dummy sound generating apparatus according to an example of the present invention will be explained. FIG. 4 is a block diagram of a dummy sound generating apparatus according to the example of the present invention.

In FIG. 4, sign 401 denotes a CPU that controls a whole dummy sound generating apparatus, 402 denotes a ROM in which a basic processing program for the dummy sound generating apparatus has been stored, and 403 denotes a RAM that is used as a work area of the CPU 401. Sign 404 denotes a hard disc drive (HDD) that controls reading/writing of data to a hard disk (HD) 405 according to control of the CPU 401, and 405 denotes the HD that stores data written according to the control of the HDD 404. Instead of the HD or in addition to the HD, an attachable/detachable recording medium such as a CD, a DVD (not shown) may be provided.

Sign 406 denotes an interface (I/F), and the I/F 406 is connected to various devices 411 to 418 described later via radio or cables and it functions as an interface between the various devices and the CPU 401. Sign 400 denotes a bus for connection of various units. The members 400 to 406 realize a function of the control unit 105 shown in FIG. 1.

Sign 410 denotes a GPS (Global Positioning Systems). The GPS 410 is a system that receives signals from a GPS satellite to obtain a geometrical position with respect to the GPS satellite, and it allows measurement to be made anywhere on the earth. The signal is a carrier wave with 1.575.42 MHz, and measurement is performed using L1 wave carrying C/A (Coarse and Access) code and a navigation message. The C/A code has a bit rate of 1.023 Mbps and a code length of 1023 bit=1 ms. The navigation message has a bit rate of 50 bps, and its code length has a sub-frame of 300 bit=6 s and a main frame of 1500 bit=30 s, where 5 sub-frames correspond to 1 main frame, and 25 main frames correspond to 1 master frame. In this manner, a current position (latitude and longitude) of the vehicle is detected.

Sign 411 denotes a variety switches including the dummy sound generation instruction switch, and it provides a function of the instruction input unit 115 shown in FIG. 1. The switches include buttons on a touch panel on a display 414 described below. Sign 412 denotes a microphone that collects surrounding sounds outside the vehicle, and it provides a function of the sound collecting unit 109 shown in FIG. 1. Sign 413 denotes an audio apparatus provided with a CD drive, an MD drive, a DVD drive or similar device, and it provides a function of the audio apparatus 111 shown in FIG. 1.

Sign 414 denotes a display such as a liquid crystal display or an organic EL display, 415 denotes various lamps such as LEDs. The display 414,and the various lamps 415 realize functions of the dummy sound generation notifying unit 107 and the instruction demand notifying unit 108. The lamps 415 can notify predetermined messages to a driver or vehicle passenger according to the emitted colors (for example, an orange LED), timing of blinking, or the like. Sign 416 denotes a speaker switching device that performs switching among directions of an output of an outer speaker 419 described later, 417 denotes an amplifier that controls an output of the outer speaker 419, and 418 denotes an amplifier that controls an output of an inner speaker 420. The amplifier 417 outputs (generates) a synthesized dummy sound by the outer speaker 419 based on a control signal transmitted via the I/F 406.

Figure 5:
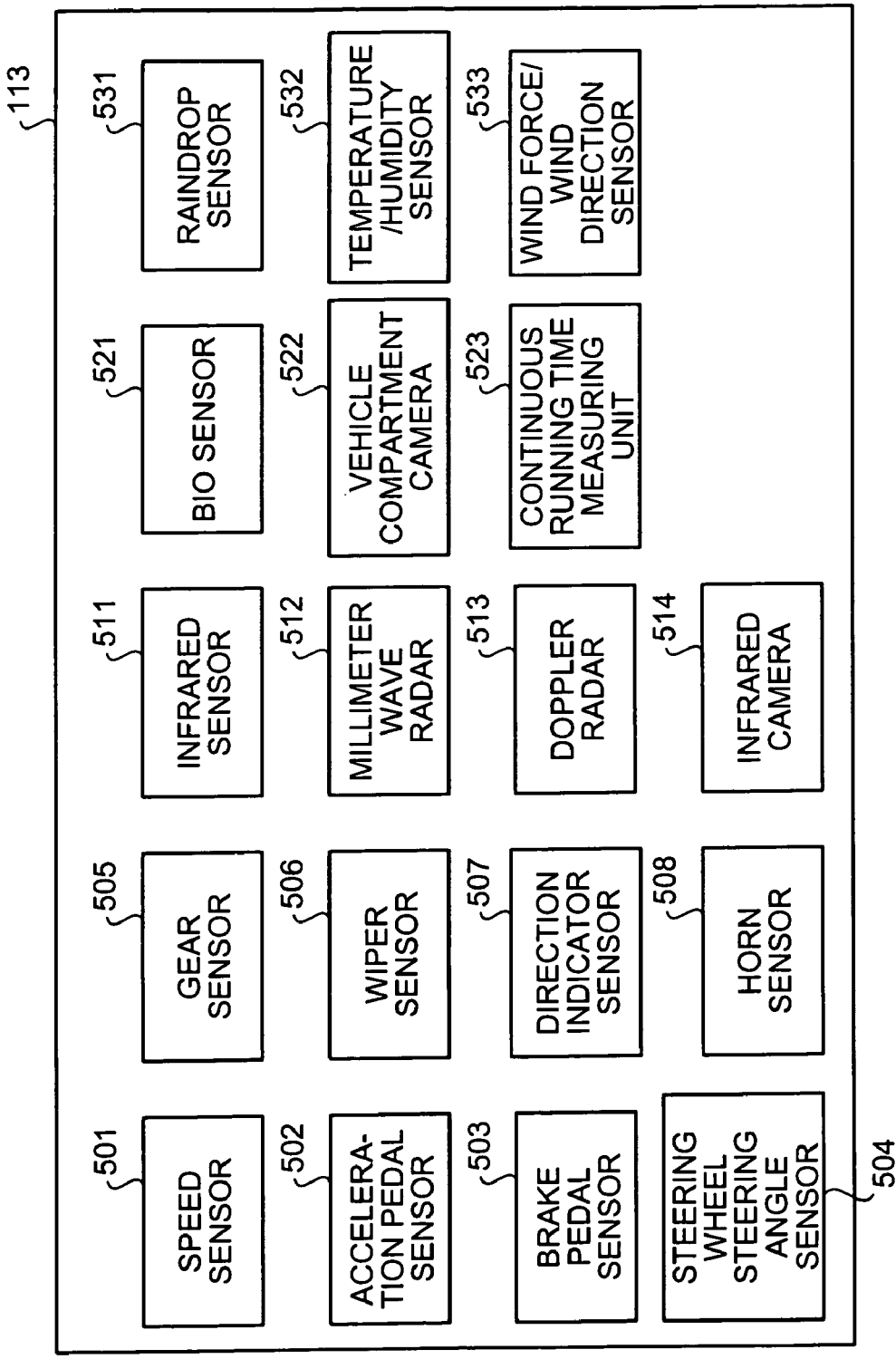
FIG. 5 is an explanatory diagram of a detecting unit of the dummy sound generating apparatus of FIG. 4.

Next, one example of the detecting unit 113 shown in FIG. 1 and FIG. 3 will be explained. FIG. 5 is an explanatory diagram of the detecting unit 113 of the dummy sound generating apparatus according to the example of the present invention. In FIG. 5, the detecting unit 113 is provided as a device for detecting a state of a vehicle with a speed sensor 501, an acceleration pedal sensor 502 and a braking pedal sensor 503, a steering wheel steering angle sensor 504, a gear sensor 505, a wiper sensor 506, a direction indicator sensor 507, a horn (klaxon) sensor 508, an infrared sensor 511 a millimeter wave radar 512, a Doppler radar 513, an infrared camera 514 and the like. In particular, it is preferable that the millimeter wave radar 512 and the infrared camera 514 are used to confirm a situation outside the vehicle.

The speed sensor 501 detects a speed of the vehicle, for example, besides the GPS 410. The acceleration pedal sensor 502 detects a stepping-in degree of the acceleration pedal, an opening degree of a throttle or the like. The braking pedal sensor 503 detects a stepping-in degree of the braking pedal. The steering wheel steering angle sensor 504 detects a steering angle or a steering speed (about whether the steering wheel is steered fast or slow) when the steering wheel is steered left or right.

The gear operation sensor 505 detects a state of a gear shifted or automatically switched. The wiper sensor 506 detects presence/absence of actuation of a wiper, a wiper actuation speed or the like. The direction indicator sensor 507 detects presence/absence of actuation of the direction indicator (the winker), which direction is indicated, and an operation time. The horn sensor 508 detects whether the horn (klaxon) has been actuated, an operation time, a state where the horn button (generally, a predetermined position on the steering wheel) has not been pushed down but a hand of the driver is in contact with the horn button, or the like.

The infrared sensor 511 detects whether a moving subject is an animal. The millimeter wave radar 512 detects a distance to a subject and a speed of the subject. The millimeter wave radar 512 is a device that detects an obstacle using a wave such as a radar used in an airplane. A collision is predicted in advance by searching for an obstacle ahead of the vehicle using the millimeter wave radar 512 and monitoring the data by a computer on the vehicle. Further, the millimeter wave radar 512 can predict a collision from urgent braking conducted by the driver.

The infrared sensor 511 can search for a situation in a surrounding area of about 100 meters, can be used in fog, rain, or snow, and may be implemented as a radar system using a wave with a 76 GHz band having an antenna power of approximately 10 millimeter watts. The millimeter wave radar 512 is configured for placement on a front face of a vehicle as part of an inter-automobile control device (ACC) system that detects an inter-vehicle distance to a vehicle running ahead or a relative speed thereto to support safe driving. The millimeter wave radar 512 may also be part of an ITS (Intelligent Traffic System).

The Doppler radar 513 detects a relative speed between the vehicle and a subject. When the subject is a pedestrian or a bicyclist, the driver can confirm whether the subject is moving in the same direction as the vehicle or is moving in an opposite direction.

The infrared camera 514 detects a pedestrian at night who may be overlooked with head lamps or street lamps to alarm the driver. Infrared detects a heat source of a human or animal even during the night.

A bio sensor 521, a vehicle compartment camera 522, and a continuous running time clock 523 may be provided for detecting conditions of the driver. The bio sensor 521 detects, for example, the heart rate of the driver. The vehicle compartment camera 522 detects the driver and the driver's eye ball movement and behavior. The continuous running time clock 523 clocks a continuous run time to estimate a degree of fatigue of the driver based on the clocked time.

A raindrop sensor 531, a temperature/humidity sensor 532, a wind force/wind direction sensor 533 are provided for detecting situations outside the vehicle. The raindrop sensor 531 detects presence/absence of raindrops and an amount thereof. Since a pedestrian may not notice the approach of a vehicle due to falling rain, it may be useful to generate a dummy sound is generated even at a place where a dummy sound would not otherwise be generated in good weather. The temperature/humidity sensor 532 detects the temperature and the humidity outside the vehicle. The wind force/wind direction sensor 533 detects a wind force and a wind direction outside the vehicle. Since a pedestrian may not notice the approaching of a vehicle due to the sound of wind on a strong windy day, it may be useful to generate a dummy sound even at a place where a dummy sound would not otherwise be generated.

The HD 405 realizes functions of the dummy sound information storage unit 101 and the detection information storage unit 106 shown in FIG. 1. The HD 405 stores a musical instrument digital interface (MIDI) sound source, which reproduces dummy sounds such as a plurality of kinds of engine sounds or braking sounds and a sequence software, which is a software for performing reproduction of MIDI data.

The kinds of engine sounds or braking sounds include ones with different bands. It is preferable to take into consideration the size of the vehicle for the generated dummy sound so that a pedestrian can intuitively comprehend the size of the vehicle from the sound. For example, an ordinary motorcar, a truck, and a bus can generate different dummy sounds. The dummy sound may be generated as a sound easily heard by a person with relatively disabled hearing, such as an aged person.

The HD 405 stores map data used for display of the GPS 410. Specifically, the HD 405 stores information on roads or buildings corresponding to the position information (latitude/longitude) that the GPS 410 has acquired or stored in advance.

The HD 405 stores information detected by the detecting unit 113 as the detection information storage unit 116 shown in FIG. 1. FIG. 6 is an explanatory diagram of one example of information stored in the HD 405 functioning as the detection information storage unit 116.

In FIG. 6, information detected for each predetermined time interval includes day and time item 601, position item 602, direction item 603, object item 604, vehicle speed item 605, and temperature/humidity item 606. Information stored in the day and time item 601 is used, for example, for determining whether a certain place is a dangerous zone depending on a time zone. In particular, a determination is made that a place is a dangerous zone when it corresponds to an attending school time and is not a dangerous zone when it corresponds to any other time. Numerical values regarding the latitude (north or south) and the longitude (east or west) detected/calculated by the GPS 410 are stored in the position item 602. Information on a moving direction of a vehicle is stored in the direction item 603. The moving direction of the vehicle can be calculated from the latitude and longitude detected just before the current time and the latitude and longitude detected at the current time.

Information on an object (a pedestrian, a bicycle or the like) moving in the same direction as a moving direction of a vehicle and an object moving in a direction opposite to the moving direction of the vehicle is stored in the object item 604. Display of the same direction: 0, the opposite direction: 3 in the item shows such a fact that there is not any object moving in a separating direction and there are three objects moving in an approaching direction. In particular, the direction detection of a pedestrian or a bicycle may be made, for example, by analyzing a face image of the pedestrian to determine whether the pedestrian is walking away from the vehicle or toward the vehicle. It is possible to acquire a relative speed between a pedestrian and the vehicle with the millimeter wave radar 512 and to determine that the pedestrian is opposed to the vehicle when the relative speed is large and that the pedestrian walks in the same direction as the vehicle when the relative speed is small.

Information on a vehicle speed acquired from the speed sensor 501 is stored in the vehicle speed item 605. Information on a temperature and a humidity acquired from, for example, the temperature/humidity sensor 532 is stored in the temperature/humidity item 606. The control unit 105 shown in FIG. 1 controls an output of the dummy sound generation instruction signal or the instruction demand notifying instruction signal based upon these information pieces.

Though not illustrated, it is possible to store information about noises around the vehicle while the vehicle is running. A dummy sound may be generated depending on the sound volume of the stored noises around the vehicle. The sound volume of the dummy sound may be adjusted depending on the volume of the noises around the vehicle.

The HD 405 stores therein information on a determination table for controlling an output of a dummy sound generation instruction signal to the outer generating unit 102 shown in FIG. 1. FIG. 7 is explanatory diagrams of one example of a determination table stored in the HD 405 functioning as the detection information storage unit 106.

FIG. 7 is a diagram of one example of a table predicting places requiring a dummy sound (dangerous zones) from map data. In the table shown in FIG. 7, when a vehicle crosses a sidewalk from a principal road to enter in an establishment such as a gas station or a convenience store, the crossing place is determined as a dangerous zone based upon the latitude/longitude information and the map data, so that the dummy sound generation instruction switch is turned ON. Similarly, when the vehicle deviates from a principal road, such as to enter a parking area for a shop or when the vehicle is located near a service area of an express highway, such a position is determined as a dangerous zone.

In these cases, a sound may be just for just a short time. It is also possible that a sound is only generated at a certain crossing or when a sidewalk is crossed. In such a case, only these spots may be stored. The conditions for turning OFF the dummy sound generation instruction switch include a situation such as when the vehicle has entered an express highway.

FIG. 8 to FIG. 11 are explanatory diagrams of one example of a determination table stored in the HD 405 functioning as the detection information storage unit 116. FIG. 8 is a diagram of one example of a table that predicts a dangerous zone based upon vehicle data (e.g., a speed, a steering angle of the steering wheel, and a braking operation). In the table shown in FIG. 8, if a speed of the vehicle becomes slow at the same time the steering wheel is frequently steered, if the vehicle does not move straight when using steering-back of the steering wheel, if a braking operation is frequently used, or if the driver puts a hand on the horn, it is determined based on information pieces from the various sensors that the place where the vehicle is running is a dangerous zone, and the dummy sound generation instruction switch is turned ON.

FIG. 9 is a diagram of one example of a table that predicts dangerous zones from physiological data. In the table shown in FIG. 9, when the heart rate of the driver is high, when eyeball movement occurs frequently and the driver exercises precaution, or when the driver makes frequent body movement and is restless, it is determined based upon information pieces from the bio sensor 521 and the vehicle compartment camera 522 that the place where the vehicle is running (current time point) is a dangerous zone, and the dummy sound generation instruction switch is turned ON.

FIG. 10 is a diagram of one example of a table that determines a dangerous zone from an image. In FIG. 10, when a person is present in a running direction of a vehicle, when it is raining, or when the driver cannot recognize a pedestrian footpath due to no road shoulder, it is determined based upon information pieces from the millimeter wave radar 512, the infrared camera 514, the raindrop sensor 531, and the infrared sensor 511 that the place where the vehicle is running (current time point) is a dangerous zone, and the dummy sound generation instruction switch is turned ON.

FIG. 11 is a diagram of one example of a table that predicts a dangerous zone from route data using the GPS 410. In the table shown in FIG. 11, for example, when the vehicle approaches a target destination, when the vehicle enters in a shopping street, when the vehicle runs on a narrow road or a life road (i.e., a road used in everyday life) except for a principal road, when the vehicle turns at an intersection based upon a determination from a set route, when the vehicle moves from a narrow road to a wide road, when the vehicle enters a narrow road from a principal road, or when the vehicle runs on a road that does not have a footpath, it is determined based upon the latitude/longitude information pieces and the map data that the place where the vehicle is running is a dangerous zone, and the dummy sound generation instruction switch is turned ON.

Next, a procedure for a more specific determination processing performed in the control unit 105 will be explained. FIG. 12 to FIG. 15 are flowcharts of one example of a procedure of a determination processing performed in the control unit 105. The flowchart shown in FIG. 12 shows content of a determination processing based on a state of a driver. In the flowchart shown in FIG. 12, it is determined whether the vehicle is in a preset dangerous zone at the current time (step S1201). If the vehicle is in the dangerous zone, (step S1201: Yes), then control is performed to generate a dummy sound regardless of the detection result obtained by the various sensors (step S1204), and the control returns back to step S1201.

If the vehicle is out of the dangerous zone (step S1201: No), it is determined whether a vehicle speed is slow and the steering wheel is frequently steered (step S1202), and it is determined whether the driver is tense (step S1203). If either one of the processings is satisfied (step S1202: Yes or step S1203: Yes), then control is made to generate a dummy sound (step S1204), and the control returns back to step S1201.

If none of the processings is satisfied (step S1202: No and step S1203: No), then control is performed to stop the dummy sound (step S1205), and the control returns back to step S1201.

Figure 13:
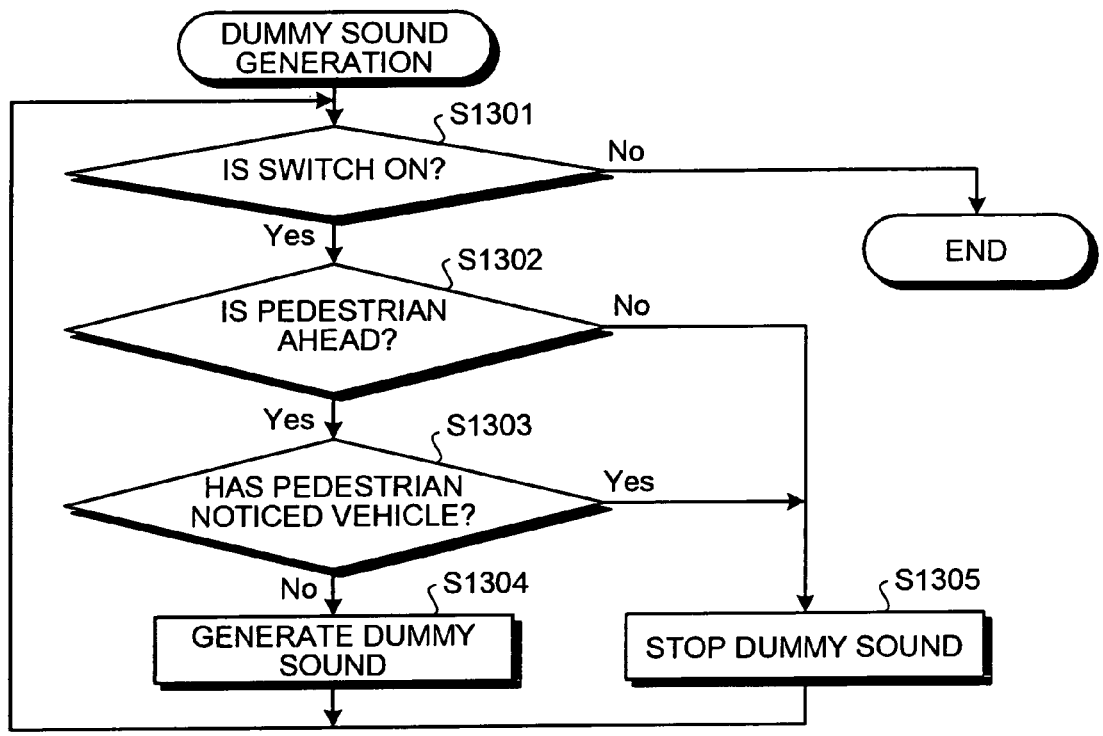
FIG. 13 is a flowchart of another example of a determining process for a control unit.

The flowchart shown in FIG. 13 shows content of a determination processing based upon a situation outside the vehicle. In the flowchart shown in FIG. 13, it is determined whether the dummy sound generation instruction switch is ON (step S1301). If the switch is ON (step S1301: Yes), it is determined whether a pedestrian is present ahead of the vehicle (step S1302) and whether the pedestrian notices the presence of the vehicle (step S1303). If no pedestrian is present (step S1302:No) or if the pedestrian is present (step S1302: Yes) but notices the presence of the vehicle (step S1303: Yes), then control is made to stop a dummy sound (step S1305), and the control returns back to step S1301.

At step S1303, if the walker does not notice the presence of the vehicle (step S1303: No), then control is made to generate a dummy sound (step S1304), and the control returns back to step S1301. At step S1301, if the switch is OFF (step S1301: No), then the processing terminates. With such a process, it is possible to prevent the useless, continuous generation of a dummy sound.

Figure 14:
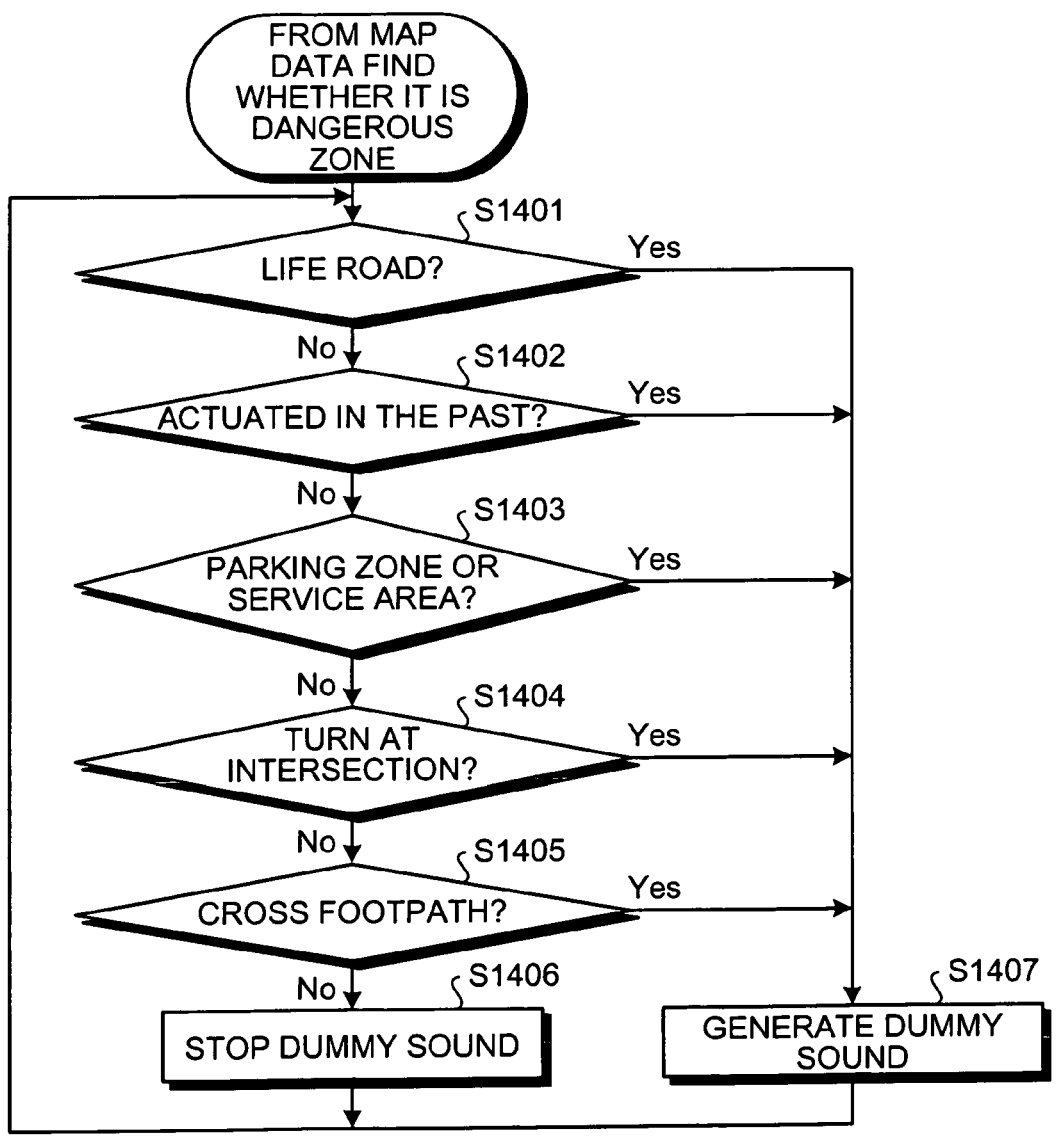
FIG. 14 is a flowchart of another example of a determining process for a control unit.

The flowchart shown in FIG. 14 shows content of a determination processing to find from the map data whether it is a dangerous zone. As shown in FIG. 14, it is determined whether the current point is on a life road (step S1401), whether actuation was made in the past (step S1402), whether the current point is in a parking zone or an SA (a service area) (step S1403), whether the vehicle is turning at an intersection (step S1404) and whether the vehicle crosses a predestrian footpath (step S1405).

If the vehicle falls under any one of the above situations (step S1401: Yes, step S1402: Yes, step S1403: Yes, step S1404: yes or step S1405: Yes), then it is determined that the vehicle is present in a dangerous zone, control is made to generate a dummy sound (step S1407), and control returns back to step S1401.

However, if none of the above situations are applicable (step S1401: No, step S1402: No, step S1403: No, step S1404: No and step S1405: No), then control is made to stop a dummy sound (step S1406), and the control returns back to step S1401. With such a process, it is possible to appropriately determine a place to generate a dummy sound and to do so effectively.

Figure 15:
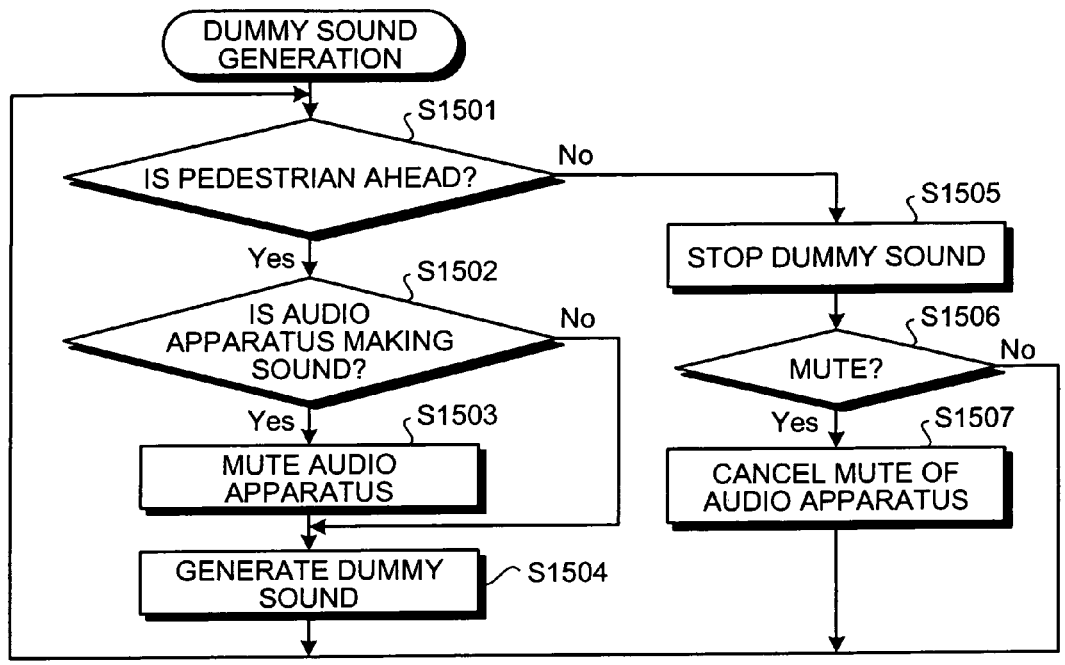
FIG. 15 is a flowchart of another example of a determining process for a control unit.
Figure 16:
FIG. 16 is a diagram of one example of content to be notified by an instruction demand notifying unit.
Figure 17:
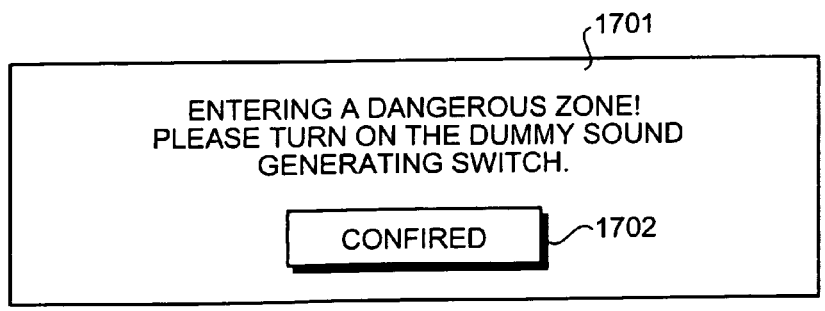
FIG. 17 is a diagram of another example of content to be notified by an instruction demand notifying unit.

The flowchart shown in FIG. 15 shows content of a processing that controls a sound volume of the audio apparatus 413 interlocked with the control of dummy sound generation. In FIG. 15, it is determined whether a predestrian is present ahead of a vehicle (step S1501). If a pedestrian is present (step S1501: Yes), it is determined whether the audio apparatus 413 is making a sound (step S1502). If the audio apparatus 413 is making the sound, (step S1502: Yes), then the audio is muted or the volume is lowered (step S1503). If the audio apparatus is not making a sound (step S1502: No), then nothing is done. Regardless of whether the audio apparatus 413 is making a sound, a dummy sound is generated (step S1504), and the control returns back to step S1501.

At step S1501, if a walker is not present ahead (step S1501: No), then control is made to stop the dummy sound (step S1505). Thereafter, it is determined whether the audio apparatus 413 is muted or whether the volume is lowered (step S1506). If the audio apparatus 413 has been muted (or volume lowered) (step S1506: Yes), the muted state is cancelled (step S1507). Nothing is done, however, if the audio apparatus 413 has not been muted (step S1506: No). Thereafter, the control returns back to step S1501. With such a process, a driver can easily recognize that a dummy sound has been generated automatically.

A dummy sound may be generated by touching a horn button. If an indication of the approach or passing-through of a vehicle cannot be established by generation of a dummy sound, the indication can be provided to a pedestrian by pushing down the horn button. As a result, a pedestrian can be notified of the approach or passing-through of a vehicle without causing unnecessary discomfort or stress to the pedestrian.

Next, content notified by the instruction demand notifying unit 108 shown in FIG. 1 will be explained. FIG. 16 to FIG. 19 are explanatory diagrams of one example of content notified by the instruction demand notifying unit 108. A display screen 1601 shown in FIG. 16 makes notification to turn ON a dummy sound generation switch when a pedestrian is present. A display screen 1701 shown in FIG. 17 makes notification to turn ON the dummy sound generation switch when a vehicle has entered into a dangerous zone.

Figure 18:
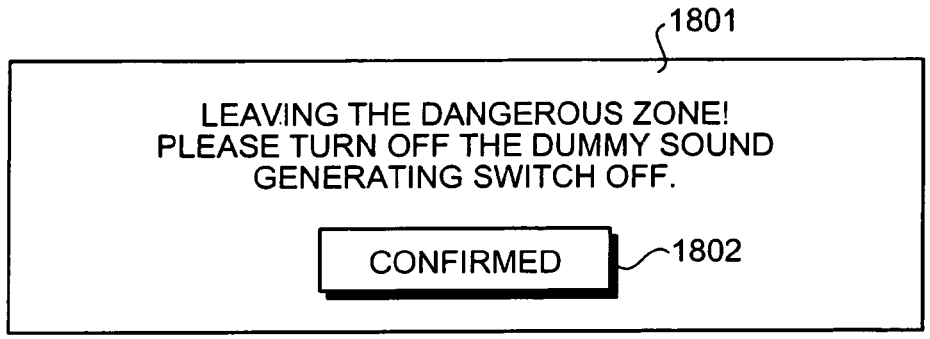
FIG. 18 is a diagram of another example of content to be notified by an instruction demand notifying unit.
Figure 19:
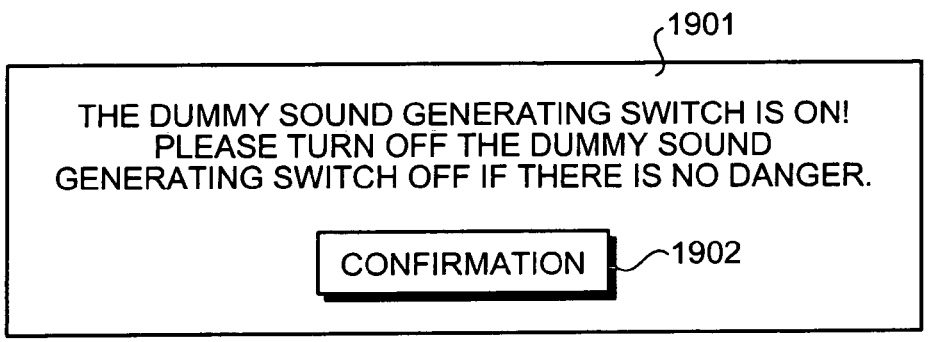
FIG. 19 is a diagram of another example of content to be notified by an instruction demand notifying unit.

A display screen 1801 shown in FIG. 18 makes notification to turn OFF the dummy sound generating switch when the vehicle has left the dangerous zone. A display screen 1901 shown in FIG. 19 makes notification to turn OFF the dummy sound generating switch when a dummy sound is being continuously generated for a certain time or the vehicle has traveled a predetermined distance while continuously generating a dummy sound. In either case, the display screens 1601, 1701, 1801, and 1901 are cancelled by pushing down "confirmation" buttons 1602, 1702, 1802, and 1902.

The instruction demand notification can be made using a display 414, but it is possible for the instruction demand notification to be made in other ways. For example, notification can be made in accordance with the light-emitting color of a lamp, the timing of the blinking of the lamp, or a voice notification.

Figure 20:
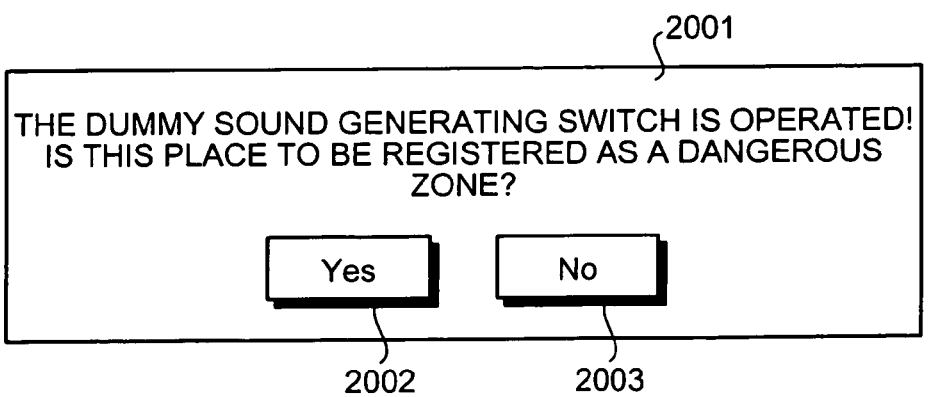
FIG. 20 is a diagram of one example of content to be notified by a dummy sound generation notifying unit.

Next, content of notification made by the dummy sound generation notifying unit 107 shown in FIG. 20 will be explained. FIG. 20 is an explanatory diagram of one example of content notified by the dummy sound generation notifying unit 107. A display screen 2001 shown in FIG. 20 is for confirming to the driver, if the dummy sound generating switch is operated, whether a place where the switch is operated should be registered as a dangerous zone. Registration is made by pushing "Yes" button 2002. The place is not registered as a dangerous zone by pushing "No" button 2003.

The dummy sound generation notification has been made using a display 414, but it is possible for the dummy sound generation notification to be made in other ways. For example, notification can be made in accordance with the light-emitting color of a lamp, the timing of the blinking of the lamp, or a voice notification.

Figure 21:
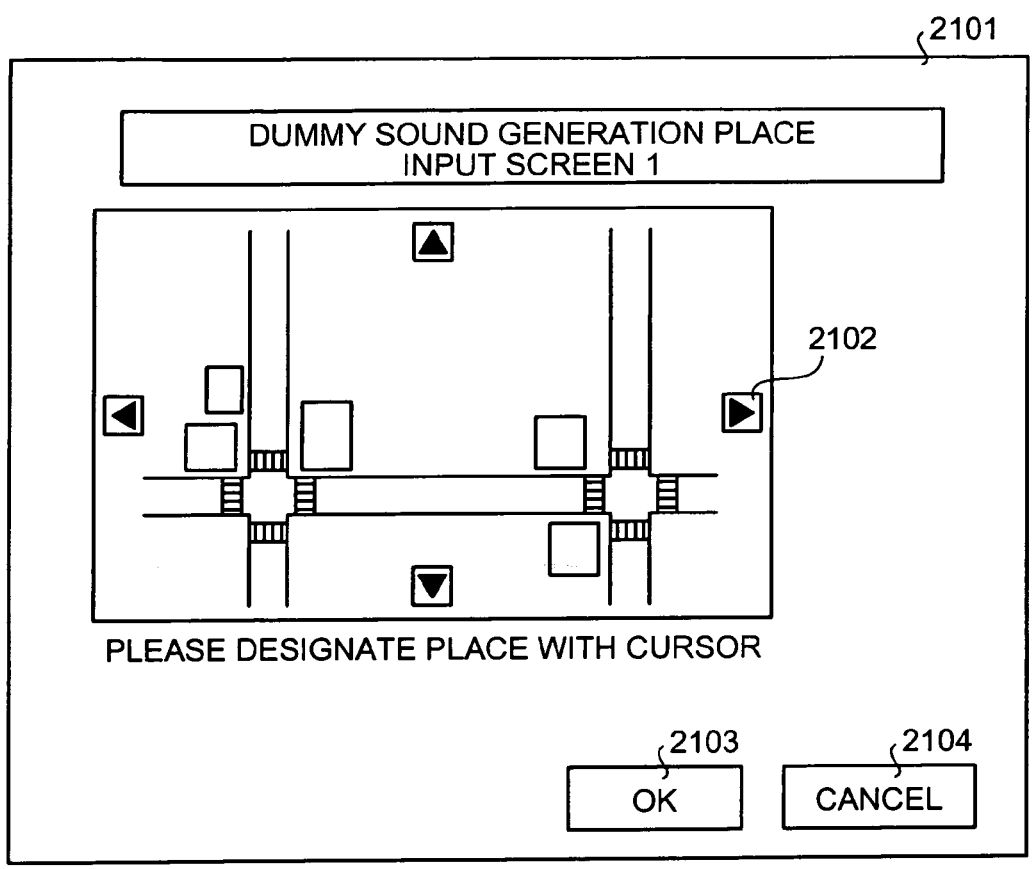
FIG. 21 is an explanatory diagram of one example of an input screen of generation place information inputted by a generation place information input unit.
Figure 22:
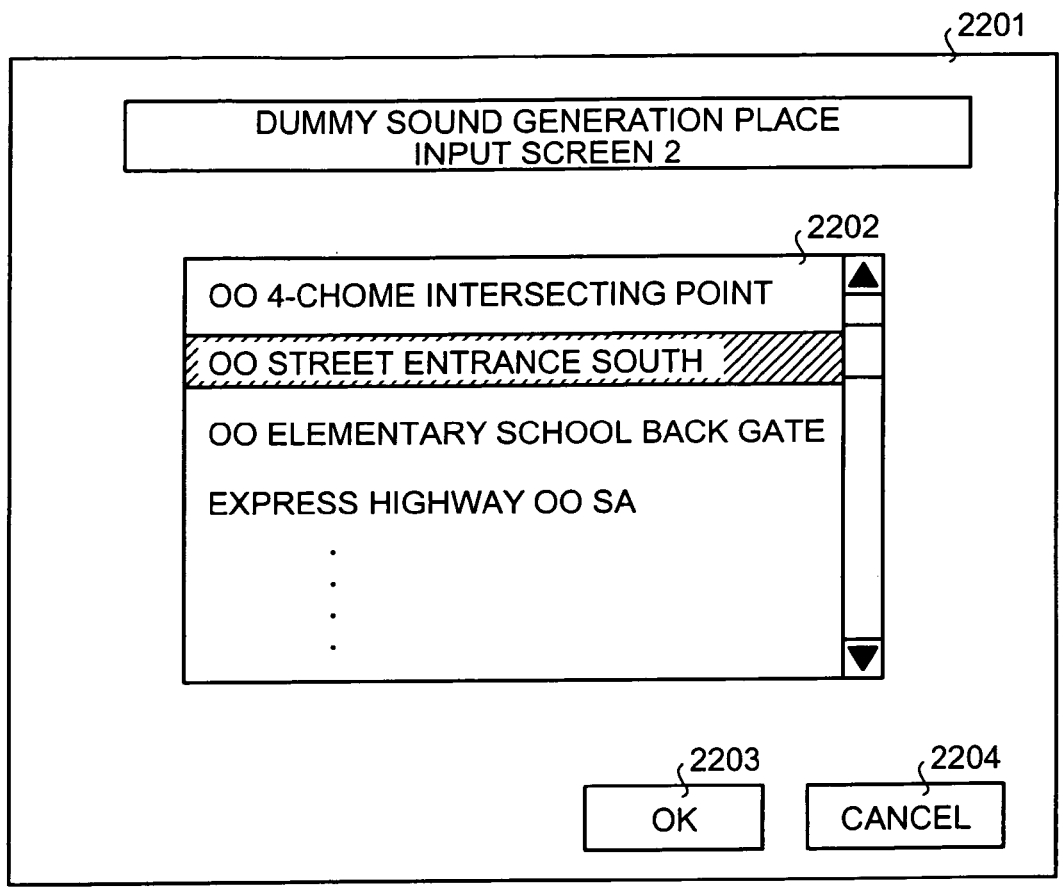
FIG. 22 is an explanatory diagram of another example of an input screen of generation place information inputted by the generation place information input unit.
Figure 23:
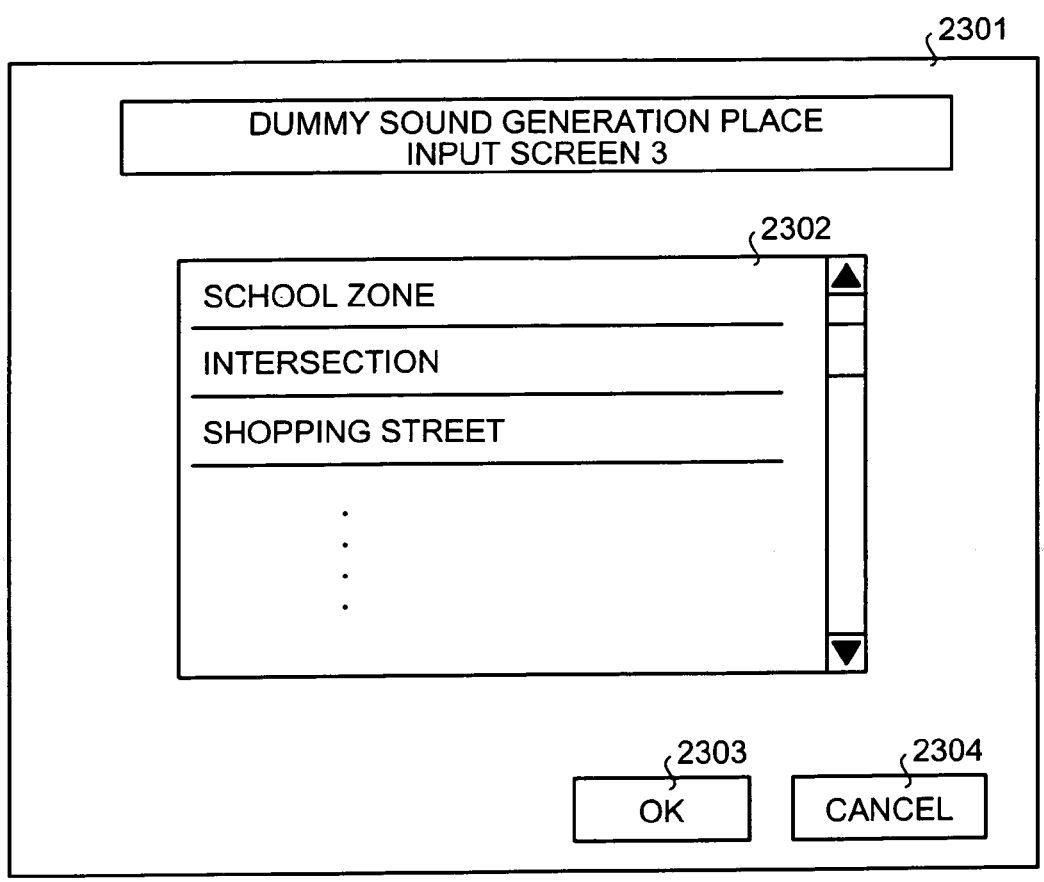
FIG. 23 is an explanatory diagram of another example of an input screen of generation place information inputted by the generation place information input unit.

Next, content of an input screen of generation place information inputted by the generation place information input unit 106 will be explained. FIG. 21 to FIG. 23 are explanatory diagrams of one example of an input screen of generation place information provided by the generation place information input unit 106.

In a dummy sound generation place input screen 2101 shown in FIG. 21, a map image 2102, such as a display image of a car navigation, is displayed. Further, a place where a dummy sound is to be generated is designated on the displayed map image 2102 by a cursor, and an "OK" button 2103 is pushed down so that latitude/longitude information on the designated place is extracted and stored in the generation place information storage unit 103 as dummy sound generation place information.

In a dummy sound generation place input screen 2201 shown in FIG. 22, specific places including latitude/longitude information, such as "XX 4-chome intersecting point" or "XX street entrance south," are displayed on a selection field 2202 as a list. Further, a desired place is selected from the list, and an "OK" button 2203 is pushed down so that the latitude/longitude information of the place is stored in the generation place information storage unit 103 as dummy sound generation place information.

In a dummy sound generation place input screen 2301 shown in FIG. 23, public places that do not include latitude/longitude information, such as "school zones" or "intersecting points," are displayed on a selection field 2302 as a list. Further, a desired place is selected from the list, and an "OK" button 2303 is pushed down so that latitude/longitude information on all corresponding places is extracted and stored in the generation place information storage unit 103 as a dummy sound generation place information.

In FIG. 21 to FIG. 23, when "cancel" buttons 2104, 2204 and 2304 are pushed down, all processing is suspended, and the input screens 2101, 2201 and 2301 are deleted.

As explained above, according to this embodiment, since the dummy sound information storage unit 101 stores information on a dummy sound, the outer generating unit 102 generates a dummy sound outside the vehicle based on information stored in the dummy sound information storage unit 101, the generation place information storage unit 103 stores information on a place in which a dummy sound is to be generated, the current place information acquiring unit 104 acquires information on the current position of a vehicle, and the control unit 105 controls an output of a dummy sound generation instruction signal to the outer generating unit 102 based on information stored in the generation place information storage unit 103 and information acquired by the current position information acquiring unit 104, a dummy sound (a dummy running sound) of the vehicle can be generated when the vehicle runs at a predetermined place. As a result, the approach or passing-through of a vehicle can be notified to a pedestrian near the vehicle, and attention can be provided to the pedestrian. Accordingly, noises are reduced, a drawback due resulting from such reduced noises is removed, and safe passage of a pedestrian can be ensured.

According to the embodiment, since the generation place information input unit 106 receives input of information on a place where a dummy sound is to be generated, and the generation place information storage unit 103 stores information whose input has been received by the generation place information input unit 106, the driver can generate a dummy sound at a desired place.

According to this embodiment, since the detecting unit 113 detects a predetermined situation when the vehicle is running, and the control unit 105 controls an output of a dummy sound generation instruction signal to the outer generating unit 102, notification about the approaching or passing-through of a vehicle can be made based on a predetermined situation when the vehicle is running, and attention can be provided.

According to the embodiment, since the instruction input unit 115 receives an instruction to start/terminate a dummy sound generation, the detection information storage unit 116 stores information on the result detected by the detecting unit 113 when an instruction to start/terminate a dummy sound generation is issued by the instruction input unit 115, and the control unit 105 controls an output of a dummy sound generation instruction signal to the outer generating unit 102 based on information stored in the detection information storage unit 116 and the result detected by the detecting unit 113, it is possible to store information regarding where a dummy sound was generated in the past, and a dummy sound can be generated automatically when the vehicle is in the same situation.

To generate a dummy sound more properly, for example, the detecting unit 113 may be configured to detect a situation outside the vehicle. The situation outside the vehicle may include, for example, at least one of a weather situation, a road situation, a situation of a pedestrian and a situation of other vehicles including a bicycle. The detecting unit 113 may be configured to detect a position where the vehicle is running. The detecting unit 113 may be configured to detect a condition of the driver of a vehicle.

The detecting unit 113 may be configured to detect a state of operation of the vehicle. At that time, the control unit 105 may be configured to change a direction in which a dummy sound is generated by the outer generating unit 102 based upon the state of operation of the vehicle detected by the detecting unit 113. With such a configuration, a dummy sound can be generated more properly.

The control unit 105 may be configured to control an output of a dummy sound generation instruction signal to the outer generating unit 102 based upon at least one of calendar information and time information. More specifically, for example, such a configuration can be employed that a dummy sound is generated due to a weekday or a holiday, or morning or night, even at the same place.

Such a configuration may be employed that the dummy sound information storage unit 101 stores information on various kinds of dummy sounds (specifically, for example, an MIDI sound source), and the control unit 105 outputs a dummy sound selecting signal that selects at least one of the kinds of dummy sounds. Thereby, an optimal dummy sound according to a situation can be generated, and adverse influence to the surroundings can be prevented from occurring as much as possible.

The control unit 105 may be configured to control an output of a dummy sound generation instruction signal to the outer generating unit 102 based upon the result detected by the detected unit 113 and to control an output of a sound volume control instruction signal to the audio apparatus 111 (413) provided inside the vehicle. Thereby, even when a dummy sound is automatically generated, it is possible to notify the driver of the automatically generated dummy sound.

According to the embodiment, since the dummy sound generation notifying unit 107 notifies that a dummy sound is being generated and the control unit 104 controls an output of a dummy sound generation notifying instruction signal to the dummy sound generation notifying unit 107 when a dummy sound generation notifying signal is outputted to the outer generating unit 102, such a fact can be notified to the driver even when a dummy sound has been generated automatically.

According to the embodiment, since the instruction demand notifying unit 108 makes a notification demanding an instruction to generate a dummy sound, and the control unit 104 controls an output of an instruction demand notifying instruction signal to the outer generating unit 102 instead of controlling an output of a dummy sound generation instruction signal to the instruction demand notifying unit 108, such a configuration can be employed that a dummy sound is prevented from being generated against a driver's intention.

Since the sound collecting unit 109 collects surrounding sounds outside a vehicle including dummy sounds generated outside the vehicle by the outer generating unit 102, and the inner generating unit 110 generates the dummy sounds collected by the sound collecting unit 109 inside the vehicle, a dummy sound outputted outside the vehicle and noises outside the vehicle can be recognized reliably even in a state that windows have been closed.

The dummy sound generating method according to the embodiment may be a computer (for example, a micro-computer) readable program prepared in advance and is realized by executing the program in a computer such as a personal computer or a workstation including a server. The program is recorded in a computer-readable recording medium such as recorded in a HD, FD, CD-ROM, MO, or DVD and it is executed by reading this program out of the recording medium. The program may be a transmission medium that can be distributed via a network such as the Internet.

The present document incorporates by reference the entire contents of Japanese priority document, 2004-032377 filed in Japan on Feb. 9, 2004.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. A dummy sound generating apparatus that generates a dummy sound of a vehicle, comprising:
   a dummy sound information storage unit that stores one or more dummy sounds;
   an outer generating unit that generates one of one or more dummy sounds outside of the vehicle upon reception of a dummy sound generation instruction signal;
   a generation place information storage unit that stores information on a place where the dummy sound is to be generated;
   a current position information acquiring unit that acquires information on a current position of the vehicle;
   a detecting unit that detects various predetermined situations when the vehicle is running;
   an instruction input unit that receives an instruction to start or terminate generation of one or more dummy sounds;
   a detection information storage unit that stores, among the predetermined situations detected by the detecting unit, information on an object moving toward the vehicle and an object moving away from the vehicle when the instruction to start or terminate generation of one or more dummy sounds is issued by the instruction input unit; and
   a control unit that outputs the dummy sound generation instruction signal to the outer generating unit based on information on the place stored in the generation place information storage unit, information on the current position acquired by the current position information acquiring unit, the predetermined situations detected by the detecting unit, and information stored by the detection information storage unit.

2. The dummy sound generating apparatus according to claim 1, further comprising:
   a generation place information input unit that receives input of information on the place where the dummy sound is generated,
   wherein the generation place information storage unit stores information received as an input by the generation place information input unit.

3. The dummy sound generating apparatus according to claim 1, further comprising:
   a dummy sound generation notifying unit that notifies that the dummy sound is being generated,
   wherein the control unit controls the output of a generation notifying instruction signal to the dummy sound generation notifying unit when the dummy sound generation instruction signal has been outputted to the outer generating unit.

4. The dummy sound generating apparatus according to claim 1, further comprising:
   an instruction demand notifying unit that issues a notification that demands a generation instruction of a dummy sound,
   wherein the control unit controls an output of an instruction demand notifying instruction signal to the instruction demand notifying unit instead of controlling the output of the dummy sound generation instruction signal to the outer generating unit.

5. The dummy sound generating apparatus according to claim 1, further comprising:
   a sound collecting unit that collects outer ambient sounds including the dummy sound generated outside the vehicle by the outer generating unit; and
   an inner generating unit that generates the dummy sound collected by the sound collecting unit inside a vehicle compartment of the vehicle.

6. The dummy sound generating apparatus according to claim 1,
   wherein the control unit controls an output of the dummy sound generation instruction signal to the outer generating unit based on information stored in the generation place information storage unit and information acquired by the current position information acquiring unit or based on a result detected by the detecting unit.

7. The dummy sound generating apparatus according to claim 1, wherein the detecting unit detects a situation outside the vehicle.

8. The dummy sound generating apparatus according to claim 7, wherein the situation outside of the vehicle includes at least one of a weather situation, a road situation, a situation of a pedestrian, and a situation of other vehicles, wherein the other vehicles include bicycles.

9. The dummy sound generating apparatus according to claim 1, wherein the detecting unit detects a situation of operation of the vehicle.

10. The dummy sound generating apparatus according to claim 9, wherein the control unit changes a direction in which the dummy sound is to be generated by the outer generating unit based on the vehicle operation situation detected by the detecting unit.

11. The dummy sound generating apparatus according to claim 1, wherein the detecting unit detects the situation of a driver of the vehicle.

12. The dummy sound generating apparatus according to claim 11, wherein the situation of the driver of the vehicle includes at least one of a degree of driver fatigue and a continuous driving time of the driver.

13. The dummy sound generating apparatus according to claim 1, wherein the control unit controls an output of the dummy sound generation instruction signal to the outer generating unit based on at least one of calendar information and time information.

14. The dummy sound generating apparatus according to claim 1, wherein the dummy sound information storage unit stores information on a plurality of kinds of dummy sounds, and
wherein the control unit outputs a dummy sound selecting signal that selects at least one dummy sound from the plurality of kinds of dummy sounds based on information stored in the generation place information storage unit or based on a result detected by the detecting unit.

15. The dummy sound generating apparatus according to claim 1, wherein the control unit controls an output of a dummy sound generation instruction signal to the outer generating unit and controls an output of a sound volume control instruction signal to an audio apparatus provided inside the vehicle.

16. A vehicle comprising a dummy sound generating apparatus that generates a dummy sound of a vehicle, wherein the dummy sound generating apparatus includes:
a dummy sound information storage unit that stores one or more dummy sounds;
an outer generating unit that generates one of one or more dummy sounds outside of the vehicle upon reception of a dummy sound generation instruction signal;
a generation place information storage unit that stores information on a place where a dummy sound is to be generated;
a current position information acquiring unit that acquires information on a current position of the vehicle;
a detecting unit that detects various predetermined situations when the vehicle is running;
an instruction input unit that receives an instruction to start or terminate a dummy sound generation;
a detection information storage unit that stores, among the predetermined situations detected by the detecting unit, information on an object moving toward the vehicle and an object moving away from the vehicle when the instruction to start or terminate the dummy sound generation is issued by the instruction input unit; and
a control unit that outputs the dummy sound generation instruction signal to the outer generating unit based on information on the place stored in the generation place information storage unit, information on the current position acquired by the current position information acquiring unit, the predetermined situations detecting by the detection unit, and information stored by the detection information storage unit.

17. A dummy sound generating method that generates a dummy sound of a vehicle, comprising:
acquiring information on a current position of the vehicle;
detecting various predetermined situations when the vehicle is running;
receiving an instruction to start or terminate a dummy sound generation;
storing, among the predetermined situations detected at the detecting step, information on an object moving toward the vehicle and an object moving away from the vehicle when the instruction to start or terminate the dummy sound generation is issued at the receiving step; and
generating a dummy sound outside the vehicle based on information, stored in advance, on a place where a dummy sound is to be generated, the information acquired on the current position, the predetermined situations detected at the detecting step, and information stored at the storing step.

18. A computer-readable recording medium that stores therein a computer program which causes a computer to execute a method for generating dummy sound of a vehicle, the computer program causing the computer to execute
acquiring information on a current position of the vehicle;
detecting various predetermined situations when the vehicle is running;
receiving an instruction to start or terminate a dummy sound generation;
storing, among the predetermined situations detected at the detecting step, information on an object moving toward the vehicle and an object moving away from the vehicle when the instruction to start or terminate the dummy sound generation is issued at the receiving; and
generating a dummy sound outside the vehicle based on information, stored in advance, on a place where a dummy sound is to be generated, the information acquired on the current position, the predetermined situations detected at the detecting step, and information stored at the storing step.

* * * * *